United States Patent
Liberatore

(10) Patent No.: US 9,866,002 B2
(45) Date of Patent: Jan. 9, 2018

(54) RECESSED SUPPORT FOR HIDDEN SOCKETS

(71) Applicant: IT CREATION LLC, Miami Beach, FL (US)

(72) Inventor: Daniele Liberatore, Miami, FL (US)

(73) Assignee: IT CREATION LLC, Miami Beach, FL (US)

(*) Notice: Subject to any disclaimer, the term of this patent is extended or adjusted under 35 U.S.C. 154(b) by 154 days.

(21) Appl. No.: 14/821,260

(22) Filed: Aug. 7, 2015

(65) Prior Publication Data

US 2017/0040787 A1 Feb. 9, 2017

(51) Int. Cl.
| | |
|---|---|
| *H02G 3/08* | (2006.01) |
| *H02G 3/14* | (2006.01) |
| *H02G 3/12* | (2006.01) |
| *H02G 3/18* | (2006.01) |

(52) U.S. Cl.
CPC ............. *H02G 3/081* (2013.01); *H02G 3/14* (2013.01); *H02G 3/123* (2013.01); *H02G 3/18* (2013.01)

(58) Field of Classification Search
CPC ............ H02G 3/081; H02G 3/14; H02G 3/08; H02G 3/16
USPC .......................................... 220/3.8, 3.9, 3.92
See application file for complete search history.

(56) References Cited

U.S. PATENT DOCUMENTS

| | | | | |
|---|---|---|---|---|
| 7,721,908 | B2* | 5/2010 | Cronin | B65D 43/12 220/345.1 |
| 8,049,107 | B2* | 11/2011 | Dinh | H02G 3/14 174/50 |
| 2004/0155036 | A1* | 8/2004 | Wegner | H02G 3/086 220/3.2 |

* cited by examiner

*Primary Examiner* — Andrew Perreault
(74) *Attorney, Agent, or Firm* — Pearne & Gordon LLP

(57) ABSTRACT

A recessed support, preferably in a recessed box, for hidden sockets, comprises a front face from which a recessed compartment extends which is destined to house electric plugs inserted in the sockets and which has an inclined lateral wall on which at least an electrical socket is afforded. A slidable cover is associated to the front face, which is constrained to the body of the support by guide and sliding means so as to be slidable between a closed position for covering the compartment and an open position which uncovers the compartment. Also present are a first and a second blocking screw of the socket to the inclined lateral wall; both the first and the second blocking screw in turn comprise:
  a stem having at least a threaded portion;
  a screwing head having a transversal dimension that is greater than the stem; the stem being interposed between the cover in the closed position and the head.

4 Claims, 7 Drawing Sheets

RECESSED SUPPORT FOR HIDDEN SOCKETS

The present invention refers to a novel recessed support for hidden electric sockets.

A recessed support is known for at least a hidden socket, comprising a front face from which a recessed compartment extends which is destined to house at least an electric plug inserted in a corresponding socket and which has an inclined lateral wall on which said socket is afforded. A slidable cover is associated to the front face, which is constrained to a support body by guide means so as to be slidable between a closed position in which it covers the compartment and an open position in which it uncovers the compartment.

The sockets are typically connected by elements fittable by elastic deformation.

A general aim of the present invention is to disclose a novel support for hidden sockets provided with a slidable cover which enables connecting the sockets alternatingly, at the same time enabling optimisation of the space available for the electric plugs.

The specified aims are substantially achieved by a support for hidden sockets provided with a slidable cover, comprising the technical characteristics set forth in one or more of the appended claims.

To make the explanation of the novel principles of the present invention clearer, as well as its advantages with respect to the prior art, in the following a realisation applying the principles will be described with the aid of the accompanying drawings. In the drawings.

Figure 1:
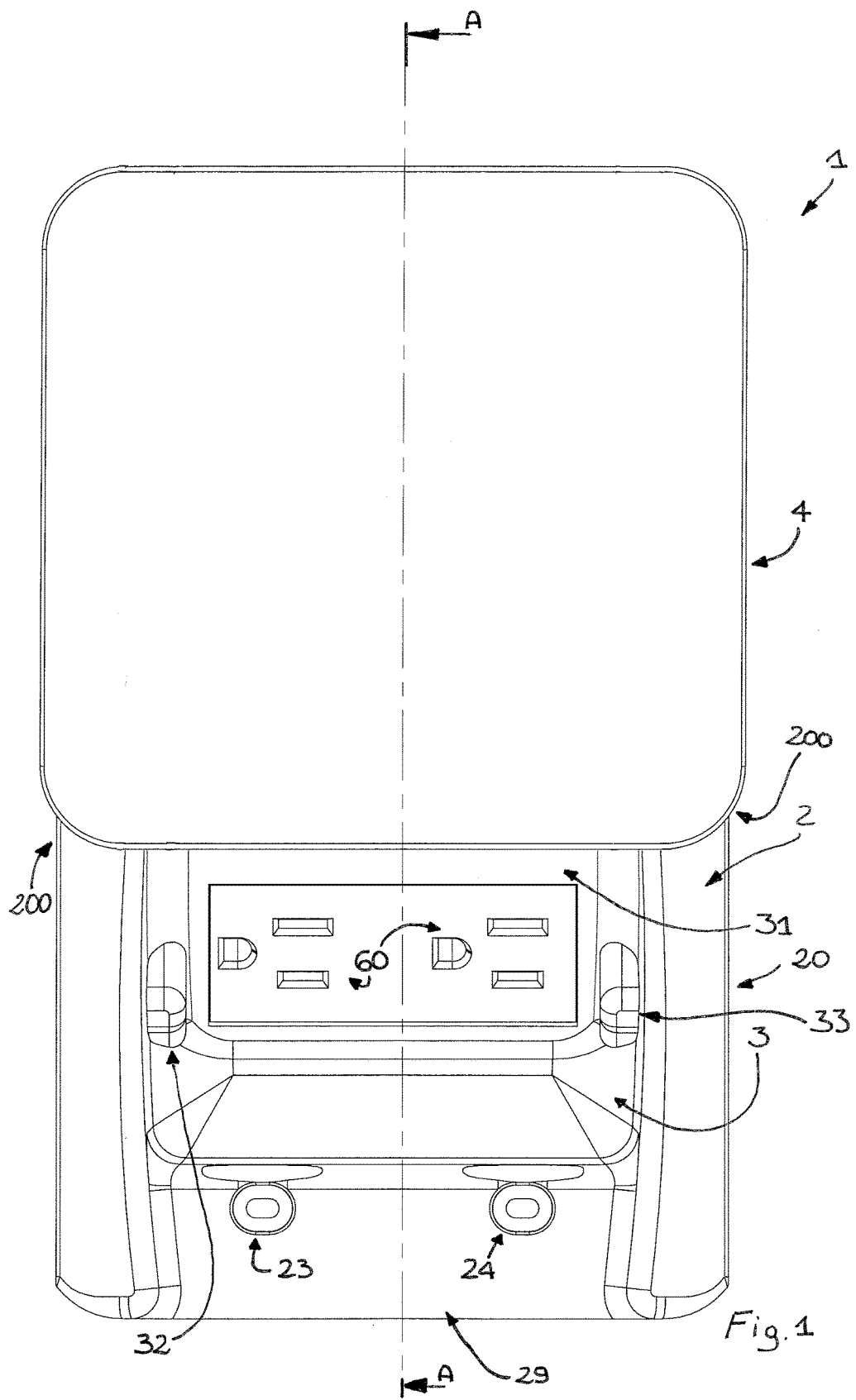
FIGS. 1 and 2 show two front views, respectively in an open configuration and a closed configuration according to the present invention.

With reference to the figures, FIG. 1 illustrates a support, denoted in its entirety by reference numeral 1, made according to the principles of the present invention. The support, preferably moulded in a plastic material, is advantageously destined to be inserted in a known box 7, preferably of the recessed type, with breakable walls for inlet of tubes for electric cables.

The support 1 comprises a body 20 with a front face or surface 2, into which a recessed compartment 3 frontally opens, destined to house one or more electric plugs. An inclined wall 31 is defined in the compartment, from which one or more electric sockets is afforded into the compartment. The electric sockets can be of various known types according to needs.

The sockets denoted by reference numeral 60 can advantageously be of a modular type so as to be chosen according to needs. The modular elements can advantageously be of standard dimensions, and the support 1 can be dimensioned to house pre-existing electric sockets.

When the sockets are made with modules to be introduced into the support, the wall 31 identifies a suitable opening for the modules and will be closed by the front face of the modules themselves. Usually the modular elements are to be introduced into the support 1 in a perpendicular direction to the inclined wall 31, as can clearly be seen in FIGS. 3 and 4, so that they are retained in such a way that the front face thereof realises or completes the inclined wall 31.

The support 1 advantageously also comprises fastening screws in the seating of the recess, usually constituted by the box 7, as will become clear in the following.

The front face 2 of the support 1 preferably comprises four slots 23, 24, 25, 26 for the fastening screws (the fastening screws are not explicitly illustrated, but are destined to be positioned in the corresponding slots 23, 24, 25, 26). Two of the slots 23, 24 are arranged along an edge 28 which superiorly delimits an access mouth 27 to the compartment 3. Another two of the slots 25, 26 are arranged along an edge 29 which inferiorly delimits an access mouth 27 to the compartment 3.

The front face 2 of the support 1 usually has a rectangular shape. The fastening screws cross the slots 23, 24, 25, 26 to screw into perforated tabs, present in corresponding positions on the sides of the box 7.

Figure 2:
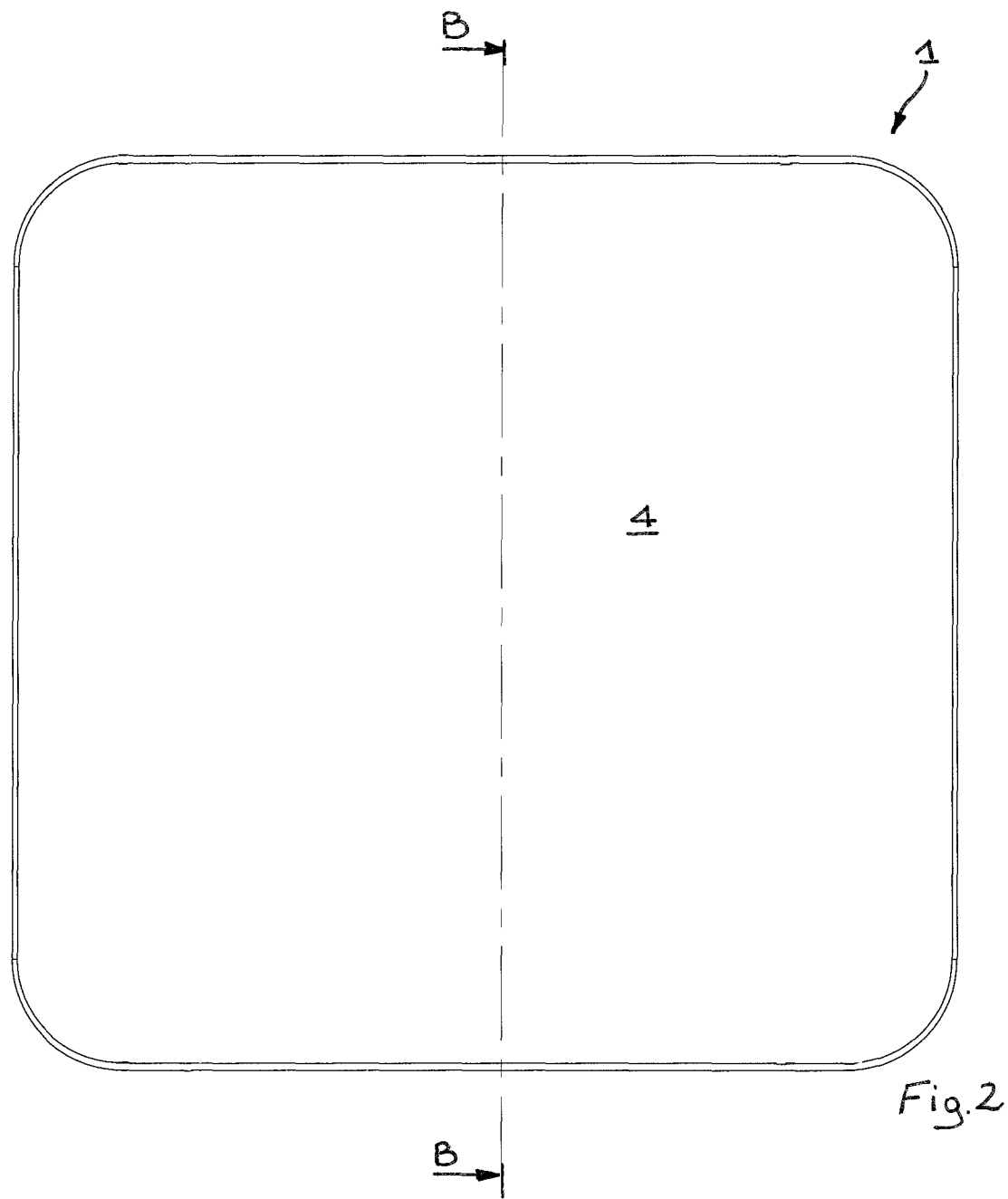
Figure 3:
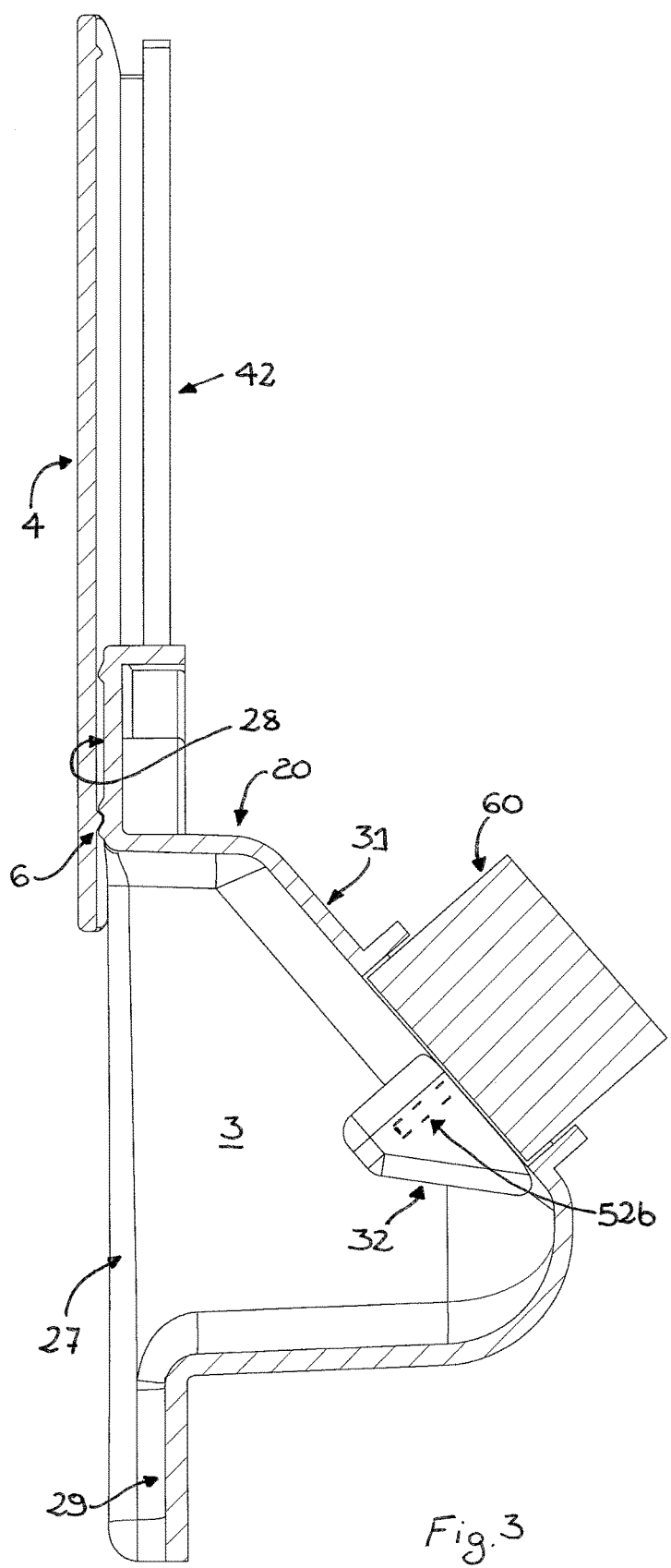
FIG. 3 shows a section view according to plane A-A of FIG. 1.
Figure 4:
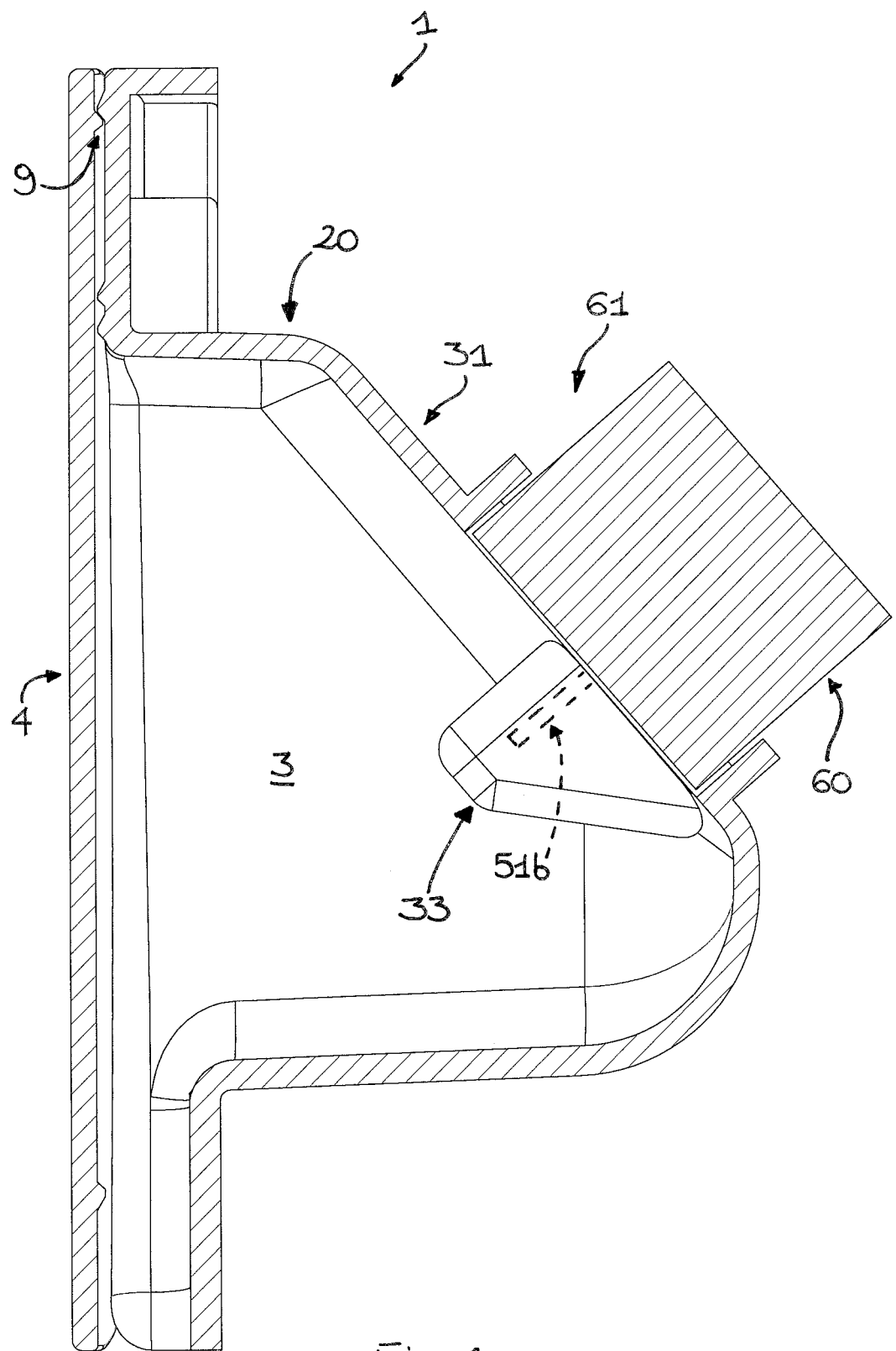
FIG. 4 shows a section view according to plane B-B of FIG. 2.
Figure 5:
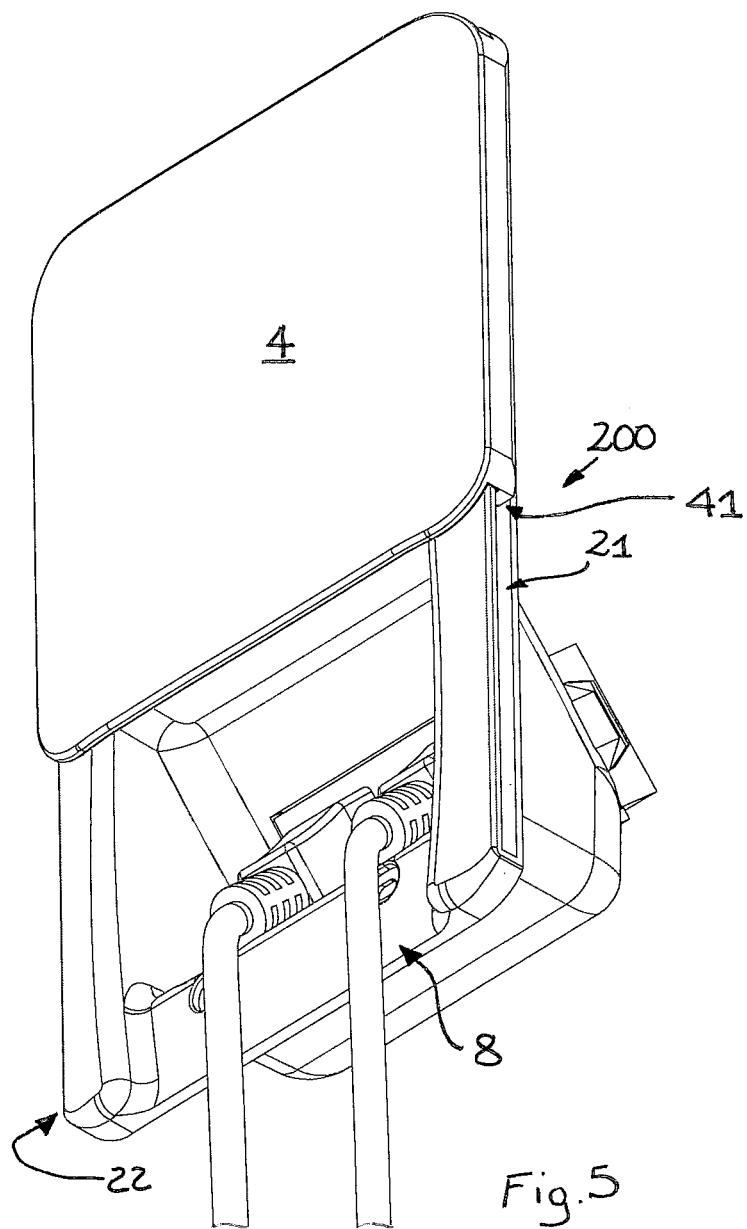
FIGS. 5 and 6 show two front views, respectively in an open configuration and a closed configuration according to the present invention, to which electric plugs are connected.
Figure 6:
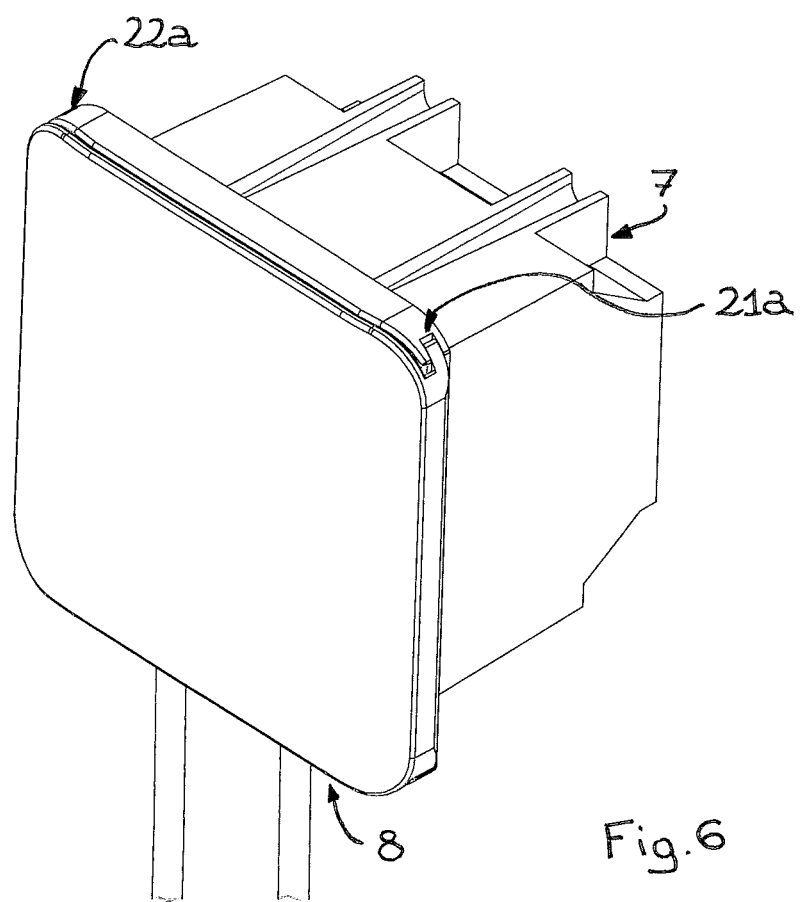
Figure 7:
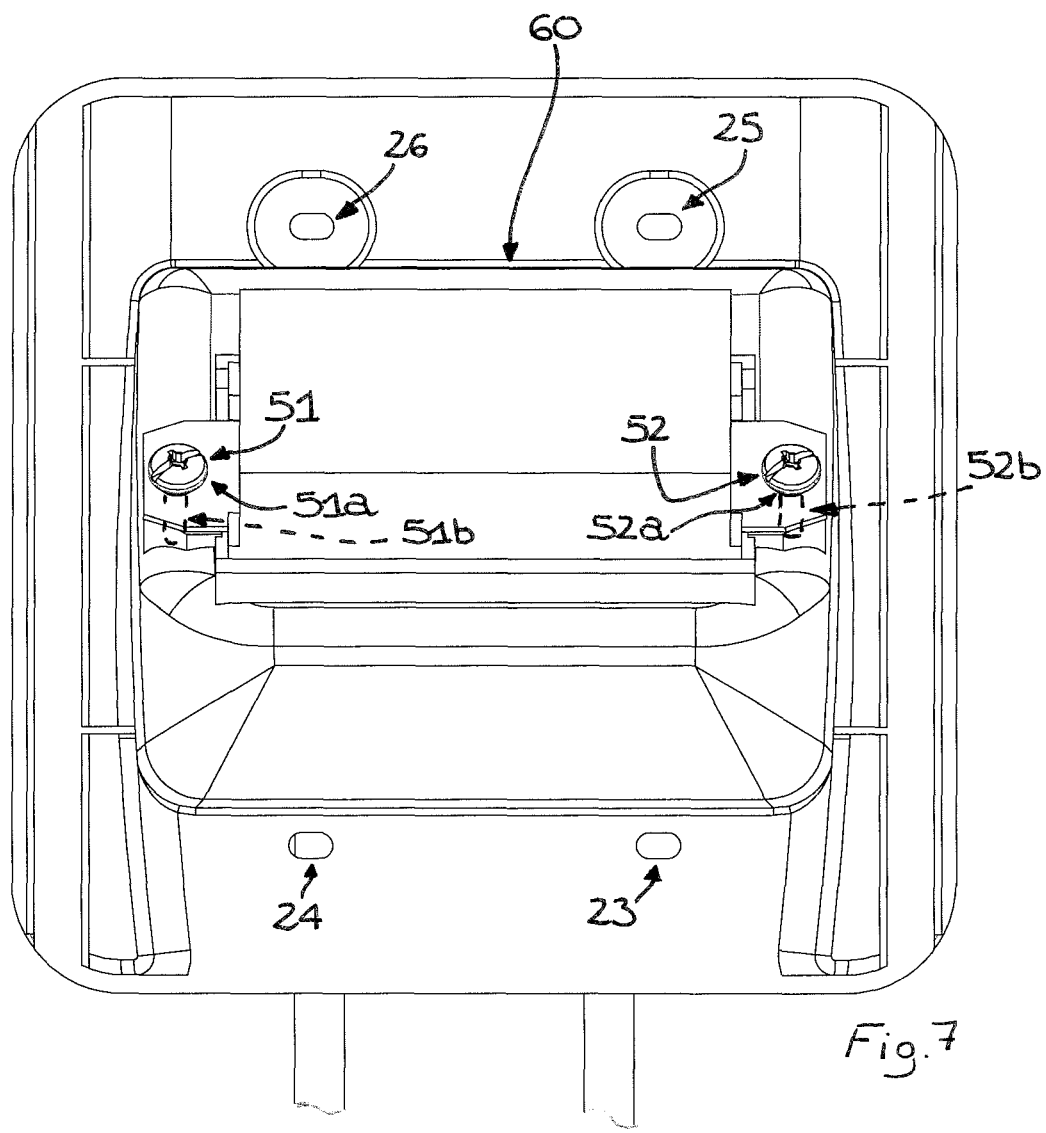
FIG. 7 shows a rear view of the support according to the present invention, to which electric plugs are connected.

A cover 4 is also associated on the front face 2 of the support 1, which cover 4 is slidable on the front face so as to move between an open position, shown in FIG. 1 or 3 or 5, in which the compartment 3 is accessible, and a closed position, shown in FIG. 2 or 4 or 6, in which the cover 4 covers the compartment 3 and, preferably, completely covers the front face 2 of the support 1.

The dimensions of the compartment 3 are such as to enable the housing of plugs and the re-closing of the slidable cover with the electric cables of the plugs which advantageously exit from the support 1 through a passage 8 which is predisposed between the front face 2 and the cover 4 (in a position opposite to the wall 31). As can be clearly observed in FIG. 5, the passage 8 is advantageously obtained by a step-lowering of the border frame formed by the front support wall of the support 1 about the compartment 3.

To enable the movement of the cover between the open and closed position, suitable guide and sliding means 200 are present between the support 1 and the cover 4.

A first and a second blocking screw 51, 52 are suitable for connecting the socket to the inclined lateral wall 31. Both the first and the second blocking screw 51, 52 in turn comprise:

a stem 51b, 52b having at least a threaded portion;

a screwing head 51a, 52a having a transversal dimension that is greater than the stem 51b, 52b; the stem 51b, 52b is interposed between the cover 4 in the closed position and the head 51a, 52a.

The first and the second blocking screw 51, 52 advantageously fit posteriorly of the inclined lateral wall 31. They cross a support of the socket 60 (for example a bracket) against which the head 51a, 52a abuts. In particular, the stem 51b, 52b extends towards the cover 4 in the closed position. The inclined lateral wall 31 advantageously defines two swellings 32, 33 which house the stem 51b, 52b of the corresponding blocking screws 51, 52 separating it from the actual compartment 3. Flaps of the support bracket of the socket are therefore interposed between the heads 51a, 52a of the first and second fastening screw 51, 52 and the inclined lateral wall 31.

FIG. 6 shows how the box 7 (of a substantially standard type) can be walled with the front face open and arranged flush to the wall, so that the support 1 fixed thereto is located with the front face parallel to and external of the wall. In the closed position thereof the cover is located parallel to the wall and with sufficient play to enable sliding thereof.

Known walled tubes can lead the electrical conductors into the box, as is normal for recessed plants.

Elastic fitting means 9 can also be included (for example in the form of respective elastic teeth projecting from the facing surfaces, as can better be observed in FIG. 4) which maintain the cover 4 in the closed position. The elastic fitting means 9 advantageously are located on the cover 4 and on the edge 28 superiorly delimiting the access mouth 27 to the compartment 3.

Likewise fitting means 6 are present between the cover 4 and the front face 2, which fitting means 6 halt a sliding of the cover into the open position and which are elastically yielding by applying an established sliding extra-force in order to enable a further sliding of the cover towards the total removal.

At this point the person skilled in the art will understand how the cover 4 can be mounted to and demounted from the body 20 of the support.

As can clearly be seen in FIG. 1, the support 1 comprises the front face 2 realised with a general form of a slim parallelepiped which on the opposite lateral walls exhibits the guide grooves 21, 22 for the cover 4. A body moulded integral with the front face and having a slim wall for internally identifying the compartment 3 extends posteriorly from the front face 2 (with respect to the front face 2 destined to be covered by cover 4).

A space 61 destined to house the rear part of the socket 60 is identified behind the inclined wall 31 (i.e. on the face of the inclined wall 31 opposite the compartment 3). The space 61 is destined to remain closed and inaccessible when the support 1 is mounted in place and in use, for example inside the box 7.

The longitudinal section of the body 20 in plane A-A is generally advantageously trapezoidal with a larger base thereof located in the opening of the compartment towards the outside. This enables to have the requested spaces and at the same time to house the plugs in the compartment 3 which couple with the socket or the sockets appearing from the wall 31. As is visible in FIG. 3 or 4, the inclination of the wall 31 is advantageously chosen so that the cable of the plug can exit, without unnatural bending, through the passage 8.

The support covers the rear part of the socket 60. This is advantageous when the support 1 is in use as the rear part is not reachable from outside and accidental contact is prevented for example with electrical fastening clamps of the cables to the socket.

To enable the screwing of the conductors the connections can be carried out before stably fixing the modular grip in place.

At this point it is clear how the prefixed aims are attained, providing a novel support for hidden sockets with a slidable cover. The positioning of the blocking screws so that the stem starting from the head extends towards the cover in the closed position enables optimising the space available internally of the compartment. Indeed, the head of the blocking screw (which has a dimension, evaluated perpendicularly to the screwing axis, greater with respect to the stem) remains posterior with respect to the inclined lateral wall 31. The walls of the compartment 3 can be profiled for covering the stem 51*b*, 52*b* of the blocking screws and not the head 51*a*, 52*a* (which has a greater dimension) with a significant increase in the space available.

Naturally, the above description of an embodiment applying the novel principles of the present invention is provided solely by way of example of the novel principles and therefore should not be understood as a limitation of the scope of the invention as claimed herein.

For example, dimensions and proportions among the various parts of the support can be different from those shown according to the specific needs and the eventual standards to be satisfied.

The dimensions of the box can be those of standard boxes already present on the market and therefore very widespread, but it can have other measurements as may be required by any new standards. The support, possibly with the box, can naturally be installed in a wall or any other suitable material (possibly with the use of suitable fastening screws).

A suitable lateral play is advantageously included with respect to the recessed box so as to enable, during the step of fastening with the screws, compensating any unusual inclination of the recessed box.

The invention claimed is:

1. A recessed support (1) comprises:
a hidden socket (60);
a front face (2) from which a recessed compartment (3) extends which is suitable for housing at least an electric plug inserted in the socket;
an inclined lateral wall (31) wherein said hidden socket is attached to said inclined wall;
a slidable cover (4) connected to said front face (2) by guide and sliding means (200) so as to be slidable between a closed position for covering the compartment (3) and an open position which uncovers the compartment (3);
a first and a second blocking screw (51, 52) connecting said hidden socket (60) to said inclined lateral wall (31); the first blocking screw (51) in turn comprising:
a first stem (51*b*) having at least a threaded portion;
a first screwing head (51*a*) which has a dimension, evaluated perpendicularly to a screwing axis, greater with respect to a dimension of the first stem (51*b*) evaluated perpendicularly to the screwing axis; the first stem (51*b*) being interposed between the cover (4) in the closed position and the first screwing head (51*a*);
the second blocking screw (52) in turn comprising:
a second stem (52*b*) having at least a threaded portion;
a second screwing head (52*a*) which has a dimension, evaluated perpendicularly to a screwing axis, greater with respect to a dimension of the second stem (52*b*) evaluated perpendicularly to the screwing axis; the second stem (52*b*) being interposed between the cover (4) in the closed position and the second head (52*a*);
the inclined lateral wall (31) comprising: a first swelling (32) which houses the first stem (51*b*) separating the first stem (51*b*) from the compartment (3), a second swelling (33) which houses the second stem (52*b*) separating the second stem (52*b*) from the compartment (3).

2. The support according to claim 1, wherein:
the front face (2) comprises opposite lateral edges;
the sliding cover (4) comprises lateral wings (41, 42);
the guide and sliding means (200) comprising:
i) guide grooves (21, 22); and
ii) corresponding fitting and sliding elements;
the opposite lateral edges of the front face (2) comprising said guide grooves (21, 22);
an inside of the lateral wings (41, 42) comprises said corresponding fitting and sliding elements so as to fit and slide in the grooves (21, 22) during the movement between the open and closed position.

3. The support according to claim 2, wherein the grooves (21, 22) are open at least at an end, so as to enable inserting and total removal of the cover by a further displacement beyond the open position.

4. The support according to claim 1, wherein the support (1) comprises fitting means (6) which are present between the cover (4) and the front face (2), said fitting means (6):
- halt a sliding of the cover into the open position;
- are elastically yielding by applying an established sliding extra-force in order to enable a further sliding of the cover towards a total removal.

* * * * *